United States Patent

Lani et al.

[11] Patent Number: 5,817,283
[45] Date of Patent: Oct. 6, 1998

[54] METHOD FOR REMOVING SULFUR DIOXIDE AND NITROGEN OXIDES FROM COMBUSTION GASES

[75] Inventors: Bruce W. Lani, McMurray; Manyam Babu, Upper St. Clair, both of Pa.

[73] Assignee: Dravo Lime Company, Pittsburgh, Pa.

[21] Appl. No.: 730,442

[22] Filed: Oct. 15, 1996

Related U.S. Application Data

[63] Continuation-in-part of Ser. No. 706,657, Sep. 6, 1996.

[51] Int. Cl.$^6$ .............................. B01D 53/50; B01D 53/56
[52] U.S. Cl. ................... 423/235; 423/243.08; 423/395; 204/179
[58] Field of Search ............................ 423/393, 243.08, 423/235, 244.07, 395; 204/157.3, 157.46, 177, 910, 911, 179; 96/55, 57, 69, 70

[56] References Cited

U.S. PATENT DOCUMENTS

| | | | |
|---|---|---|---|
| 807,491 | 12/1905 | Pauling | 204/177 |
| 3,919,393 | 11/1975 | Selmeczi | 423/242 |
| 3,919,394 | 11/1975 | Selmeczi | 423/242 |
| 4,367,211 | 1/1983 | Ray | 423/569 |
| 4,645,652 | 2/1987 | Kimura | 423/235 |
| 4,650,555 | 3/1987 | Rzad et al. | 204/174 |
| 4,657,738 | 4/1987 | Kanter et al. | 422/186.04 |
| 4,695,358 | 9/1987 | Mizuno et al. | 204/174 |
| 4,996,032 | 2/1991 | Stowe, Jr. et al. | 423/242 |
| 5,039,499 | 8/1991 | Stowe, Jr. | 423/242 |
| 5,147,516 | 9/1992 | Mathur et al. | 204/177 |
| 5,240,575 | 8/1993 | Mathur et al. | 204/177 |
| 5,284,557 | 2/1994 | Ukawa et al. | 204/130 |
| 5,458,748 | 10/1995 | Breault et al. | 204/177 |

FOREIGN PATENT DOCUMENTS

| | | |
|---|---|---|
| 0158823A2 | 10/1985 | European Pat. Off. . |
| 51-34868 | 3/1976 | Japan . |
| 57-56084A | 4/1982 | Japan . |
| 5-309229A | 11/1993 | Japan . |
| WO 87 02909 | 5/1987 | WIPO . |

OTHER PUBLICATIONS

Kohl et al. "Gas Purification", 4th Edition, Gulf Publishing Co. Houston TX USA, pp. 334–338, 1985 no month.
Database WPI, Section Ch, Week 9634, Derwent Publications Ltd., London, GB; Class E36, AN 96–337124 for JP 08 155 264 A (Mitsui Eng & Shipbuilding Co Ltd), 18 Jun. 1996 *abstract*.

*Primary Examiner*—Gary P. Straub
*Assistant Examiner*—Timothy C. Vanoy
*Attorney, Agent, or Firm*—Armstrong, Westerman, Hattori, McLeland & Naughton

[57] ABSTRACT

A method of removing dioxide and nitrogen oxides from a gaseous stream where an alkaline earth compound is added, either in a wet scrubbing unit which substantially saturates the gaseous stream with water, or to a gaseous stream to which water has been added, and the gaseous stream then exposed to a coronal discharge, with dry calcium hydroxide added which reacts with nitric acid formed by the coronal discharge to form calcium nitrate. Alkaline earth sulfites or sulfates, formed by reaction of the alkaline earth compound with sulfur dioxide are removed from the gaseous stream and calcium nitrate, formed by reaction of injected dry calcium hydroxide with the nitric acid produced are separated from the gaseous stream and the gaseous stream, with sulfur dioxide and nitrogen oxides removed, is discharged to the atmosphere.

23 Claims, 1 Drawing Sheet

METHOD FOR REMOVING SULFUR DIOXIDE AND NITROGEN OXIDES FROM COMBUSTION GASES

CROSS REFERENCE TO RELATED APPLICATION

This application is a continuation-in-part of application Ser. No. 08/706,657, filed Sep. 6, 1996 pending in the names of M. Babu and J. College, entitled "Process For Removing $SO_2$ and $NO_x$ From A Gaseous Stream", which application is assigned to the assignee of the present application and incorporated by reference herein.

FIELD OF THE INVENTION

The present invention is a method for removal of sulfur dioxide and nitrogen oxides from a gas stream resulting from combustion of fossil fuels, which method can additionally remove hazardous air pollutants that may be carried by the combustion gases.

BACKGROUND OF THE INVENTION

In order to protect the environment from the acidic affects of sulfur dioxide and nitrogen oxides that result in gases during the combustion of fossil fuels, such as in production of electrical power, it is necessary to remove both sulfur dioxide and nitrogen oxides from the gaseous stream produced prior to discharge of the gaseous stream to the atmosphere. In addition, the removal of hazardous air pollutants (HAPs), such as mercury, which may be present in the combustion gases is desirable.

Various methods have been proposed for removing sulfur dioxide from such gaseous streams using either dry injection or wet scrubbing of the gases. Wet scrubbing processes can use aqueous slurries or solutions of alkaline earth compounds, such as calcium carbonate, calcium hydroxide or magnesium hydroxide, such as for example are described in U.S. Pat. No. 3,919,393, U.S. Pat. No. 3,919,394, U.S. Pat. No. 4,996,032 and U.S. Pat. No. 5,039,499, all of which are assigned to the assignee of the present invention. Such sulfur dioxide removal systems meet or exceed today government regulations.

In removal of nitrogen oxides ($NO_x$), combustion modifications such as low $No_x$ burners and overtired air typically achieve no more than 60% $NO_x$ reduction. Thus, post combustion technologies must be considered if further $NO_x$ reduction is required. The removal of nitrogen oxides from such a gaseous stream is usually grouped into two groups, the selective catalytic reduction (SCR) processes or the selective non-catalytic reduction processes (SNCR). Problems exist with the SCR nitrogen oxide removal processes in that the processes consume a reagent and a catalyst bed, the catalyst being very expensive and subject to deterioration. Common reagents used in SCR processes are ammonia and urea which, in the presence of a catalyst convert NO to $N_2$ and $H_2O$. By-products produced, such as ammonium sulfate and ammonium chloride give negative results in that ammonium sulfate is sticky and has a tendency to foul air preheaters reducing the efficiency of a boiler, while ammonium chloride exits a stack as a particulate material. SCR processes are also hot side processes. The SNCR nitrogen oxide removal processes use reagents that are injected into the gaseous stream at elevated temperatures to reduce NO to $N_2$. These reagents, such as ammonia or urea are expensive and produce the same by-products as the SCR processes with their attendant disadvantages. The SNCR technology is generally expected to allow 30–50% removal of nitrogen oxides before chemical problems occur downstream of the injection point. The SNCR process is also a hot side process. Both the SCR and SNCR processes require sulfur dioxide removal downstream from the nitrogen oxide removal system, and neither process is very useful with high sulfur content coal combustion gases.

Current HAP emissions have limited regulations and therefore most such removal results from the particulate control device used in the scrubbing system, which is of limited effectiveness.

In the aforementioned copending application, Ser. No. 08/706,657, a process is described where wet scrubbing systems are used to remove both sulfur dioxide and nitrogen oxides. That process produces a wet by-product of an alkaline earth sulfate and a separate wet by-product of an alkaline earth nitrate.

It is an object of the present invention to provide a method for the removal of both sulfur dioxide and nitrogen oxides from a combustion gas stream which will produce a concentrated dry by-product.

It is another object of the present invention to provide a method for the removal of both sulfur dioxide and nitrogen oxides from a combustion gas stream where a dry alkaline earth sorbent is injected either upstream or downstream of a coronal discharge apparatus, for conversion of nitrogen oxides to nitric acid.

It is a further object of the present invention to provide a method for the removal of both sulfur dioxide and nitrogen oxides from a combustion gas stream where a by-product of dry calcium nitrate is produced.

It is yet a further object of the present invention to provide a method for the removal of both sulfur dioxide and nitrogen oxides from a combustion gas stream which also provides for the removal of hazardous air pollutants, such as mercury, from the combustion gas stream.

SUMMARY OF THE INVENTION

A method of removing sulfur dioxide and nitrogen oxides from a gaseous stream containing the same, such as the combustion gases resulting from combustion of fossil fuel, where the gaseous stream is substantially completely saturated with water, an alkaline earth compound added to remove the sulfur dioxide, and a coronal discharge used to convert nitrogen oxides to nitric acid, and where dry calcium hydroxide is added to the gaseous stream so as to react with the nitric acid and remove the same as calcium nitrate.

In a first embodiment of the method, the gaseous stream is contacted with an aqueous medium, containing an alkaline earth compound such as calcium carbonate, calcium hydroxide or magnesium hydroxide in a wet scrubbing unit, which saturates the gaseous stream with water. A sulfur or sulfate salt is formed by the reaction of the alkaline earth compound with sulfur dioxide, which salt is removed. The humidified gaseous stream, still containing nitrogen oxides is exposed to a coronal discharge to form nitric acid and dry calcium hydroxide is injected which reacts with the nitric acid to form calcium nitrate. The dry calcium nitrate is then separated and the gaseous stream discharged to the atmosphere. The dry calcium hydroxide may be injected into the gaseous stream either after the wet scrubbing and prior to exposure to the coronal discharge, after exposure to coronal discharge and prior to separation of the calcium nitrate, or at both locations. The dry calcium nitrate and any residual dry calcium hydroxide are preferably removed from the gaseous stream in a baghouse filter unit. A portion of the separated dry calcium hydroxide may be returned for contact with further gaseous stream.

In a second embodiment of the present process, the gaseous stream is substantially completely saturated with water by addition of water thereto and the dry calcium hydroxide is added to the saturated gaseous stream which reacts with sulfur dioxide to form calcium sulfite or calcium sulfate. The gaseous stream is then exposed to a coronal discharge to form nitric acid from the nitrogen oxides. Further dry calcium hydroxide is then added to the gaseous stream which reacts with the nitric acid to form calcium nitrate. The calcium sulfite or calcium sulfate, calcium nitrate and residual calcium hydroxide, all in dry solid form, are separated from the gaseous stream and the gaseous stream discharged to the atmosphere. The dry solids are preferably separated in a baghouse filter unit and a portion of separated dry residual calcium hydroxide may be returned to the system for use in removal of sulfur dioxide and/or nitric acid from further gaseous stream.

BRIEF DESCRIPTION OF THE DRAWINGS

The present invention will be more readily apparent by reference to the following description of embodiments shown in the accompanying drawings, wherein.

DETAILED DESCRIPTION

Figure 1:
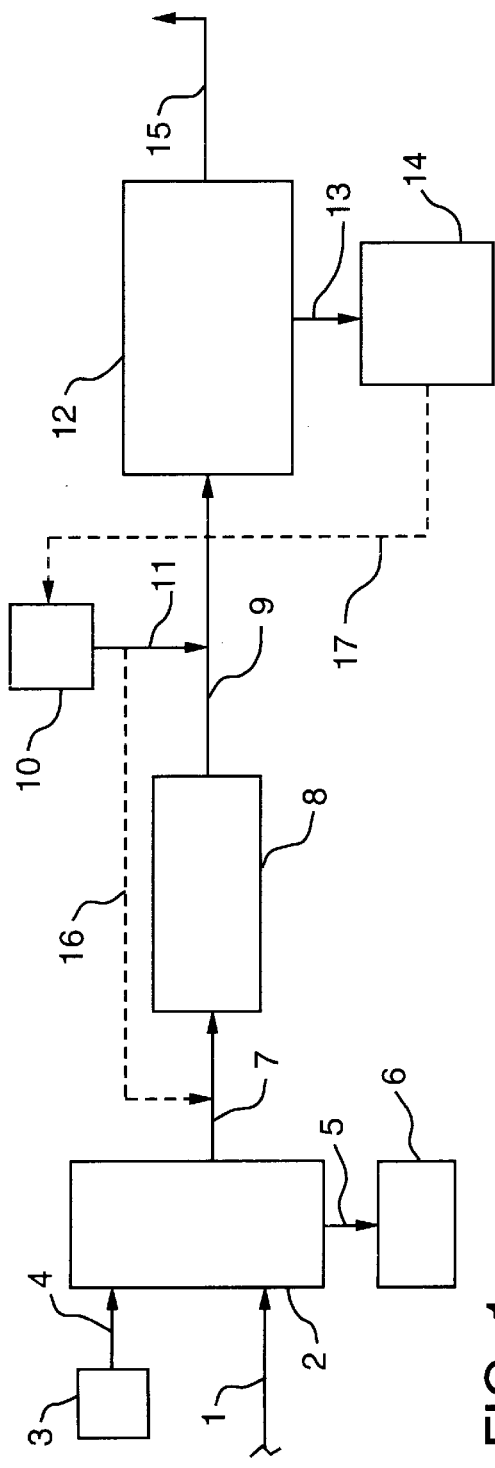
FIG. 1 illustrates schematically a first embodiment of the present method.

In a first embodiment of the present method, the gaseous stream containing sulfur dioxide and nitrogen oxides is contacted in a wet scrubbing unit with an aqueous medium containing a sulfur dioxide sorbent that is an alkaline earth compound selected from the group consisting of calcium carbonate, calcium hydroxide and magnesium hydroxide so as to remove sulfur dioxide and humidify the gaseous stream to substantially complete saturation for water. The alkaline earth compound reacts with the sulfur dioxide to form an alkaline earth sulfite salt, and, if oxidation is effected, an alkaline earth sulfate salt. The alkaline earth compound may be limestone in an aqueous slurry, lime or magnesium-enhanced lime as an aqueous slurry, such as described in U.S. Pat. No. 3,919,393 and U.S. Pat. No. 3,919,394, or an aqueous solution or suspension of magnesium hydroxide, such as is described in U.S. Pat. No. 4,996,032 and U.S. Pat. No. 5,039,499. Where limestone or lime are present, calcium sulfite or sulfate along with calcium bisulfite will be formed, while when magnesium hydroxide is present, magnesium sulfite along with magnesium bisulfite will be formed by reaction with, and removal of, sulfur dioxide from the gaseous stream. The aqueous-medium containing an alkaline earth compound is generally recycled through the wet scrubbing unit through which the gaseous stream is passed, and a bleed stream of an aqueous effluent containing the produced alkaline earth sulfite or sulfate is removed, preferably with later treatment of the alkaline earth sulfite effected to produce the desired by-products. Where calcium sulfite is produced, for example, the same may be oxidized to produce gypsum, or where magnesium sulfite is produced, the same may be used to produce magnesium hydroxide or magnesium oxide. In addition to removal of sulfur dioxide, the aqueous scrubbing medium containing the alkaline earth compound will also remove chlorine from the gaseous stream.

During contact of the gaseous stream with the aqueous medium containing an alkaline earth compound in the wet scrubbing unit, the gaseous stream will pick up water so as to become substantially completely saturated with moisture. The humidified gaseous stream, after removal of sulfur dioxide and chlorides therefrom, but still containing $NO_x$ compounds, is separated from the wet scrubbing unit.

The humidified gaseous stream which has had sulfur dioxide removed therefrom but which still contains nitrogen oxides is passed through a coronal discharge unit where the gas is exposed to a coronal discharge. The exposure of the humidified gaseous stream to a coronal discharge effects a reaction of $NO_x$ compounds to produce nitric acid which is entrained in the gaseous stream. The formation of nitric acid by use of a coronal discharge is believed to follow the following reaction sequence:

Production of oxidizing species by coronal discharge;

(1) $O_2$, $H_2O \rightarrow OH$, $O$, $HO_2$

Production of nitric acid;

(2) $NO_x \xrightarrow{OH, O, HO_2} HNO_3$.

While various coronal discharge systems may be used in the present process, an especially useful system is that described in U.S. Pat. No. 5,458,748, the contents of said patent being incorporated by reference herein. The system described in that patent uses a sulfur tolerant, high water vapor tolerant, packing free coronal catalyst, and optionally suggests the use of downstream scrubbers of wet or dry configuration to absorb particular $NO_x$ reduction products $NO_2$ and $HNO_3$, upon exposure to an arresting agent, including basic, caustic, or alkali materials such as CaO or $NH_3$.

In order to remove the nitric acid, produced from the coronal discharge, from the gaseous stream, dry calcium hydroxide is injected into the gaseous stream to react with the nitric acid and form calcium nitrate.

Preferably, the dry calcium hydroxide is added to the gaseous stream following exposure of the gaseous stream to the coronal discharge, although the dry calcium hydroxide, or a portion thereof, may be added to the gaseous stream prior to exposure of the gaseous stream to the coronal discharge.

The dry calcium hydroxide reacts with nitric acid, produced by the coronal discharge, in the humidified gaseous stream to form calcium nitrate according to the reaction.

$$2HNO_3 + Ca(OH)_2 \xrightarrow{H_2O} Ca(NO_3)_2 + H_2O.$$

The water vapor in the humidified gas stream will wet the surface of the calcium hydroxide particles enhancing the capability to react with any residual $SO_2$ from the wet scrubbing process and the products formed in the coronal discharge unit. The calcium nitrate formed is a hygroscopic salt that causes residual moisture content on the sorbent to be higher than normal. This additional moisture content will assist in the dissolution of the calcium hydroxide, enhancing the reaction with acidic species in the gas stream.

The heat of reaction of the calcium hydroxide with the acidic species in the gaseous stream will increase the temperature of the gas and provide a dry by-product that can be readily removed in a baghouse filter. The baghouse filter separation will create a reactive filter cake through which all gas from the system will pass.

When using the dry calcium hydroxide injection and coronal discharge downstream of the wet scrubbing process for sulfur dioxide removal, the operation of both those systems will be enhanced. The humidified combustion gas entering the coronal discharge unit can enhance the formation of -OH radicals from the water vapor in the combustion gas which reacts with the NO to form $NO_2$ and $HNO_3$. The abundance of water vapor in the combustion gas will wet the surface of the calcium hydroxide injected, enhancing its capability to react with residual $SO_2$ from the wet scrubbing unit and products from the coronal discharge unit.

The primary byproduct of the injected dry calcium hydroxide within the coronal discharge and $NO_2$ and $HNO_3$ is calcium nitrate. This calcium nitrate is a hygroscopic salt which causes undried moisture content on the sorbent to be higher than normal. This additional moisture content will aid in the dissolution of the calcium hydroxide, enhancing the reaction with the acidic species in the combustion gas. The dry calcium hydroxide injected will also be reactive with $SO_2$ and $SO_3$ and facilities which currently have low emissions of $SO_2$ as a result of using, low sulfur fuels or an existing $SO_2$ removal technology can maximize $SO_2$ removal hereby.

The heat of reaction of the calcium hydroxide with the acidic species of the combustion gas will increase the temperature of the gas. If quicklime were to be used for injection, heat from the hydration process will also increase the combustion gas temperature. This increase in the temperature of the combustion gas can minimize or eliminate the combustion gas reheat requirements to maintain a dry byproduct calcium nitrate in a baghouse collector. Use of a baghouse filter or collector will also create a reactive filter cake through which all of the combustion gases must pass prior to discharge to the environment. This reactive filter cake will eliminate the need for long ducts to be present for humidification, and gas/solid interactions, especially when the dry calcium hydroxide is injected downstream of a wet scrubbing unit. Baghouse filters are also known for their ability to remove submicron particulates and enhance the removal of HAPs associated with particulate emissions. The reaction of elemental HAPs, such as mercury, with the calcium hydroxide, or possibly a carbon-laced calcium hydroxide can convert the same into forms which will be readily captured by the calcium hydroxide/baghouse filter removal system.

In order to maximize utilization of the dry calcium hydroxide used, a portion of the baghouse byproduct which is collected may be recycled to the initial injection point of the dry calcium hydroxide injection. In removal of baghouse byproduct, the collected material will be bagged in moisture protective covering and usable for commercial applications or as a fertilizer.

Referring now to FIG. 1, a preferred embodiment of the present method is schematically illustrated. A combustion gas, such as that from the combustion of coal, which contain sulfur dioxide and nitrogen oxides is fed through line 1 to a wet scrubbing unit 2, where it is contacted with an aqueous medium containing an alkaline earth compound sorbent for sulfur dioxide that is charged to the wet scrubbing unit 2, from a source 3, through line 4. In the wet scrubbing unit 2, sulfur salts such as calcium sulfite, calcium sulfate or magnesium sulfite are formed by reaction of the sorbent with the sulfur dioxide and are removed through line 5 to a collector 6. The combustion gas, with sulfur dioxide now removed, and which has been substantially completely humidified, is discharged from the wet scrubbing unit through line 7 and passes to a coronal discharge unit 8. In the coronal discharge unit 8, nitric acid is formed from $NO_x$ present in the combustion gas which is entrained in the gaseous stream and discharged therefrom through line 9. Dry calcium hydroxide from a source 10 is also charged to line 9 through line 11 and the calcium hydroxide reacts with the nitric acid in the combustion gas to form calcium nitrate. The combustion gas stream is then charged to a filtering device, such as a baghouse filter unit 12. In the baghouse filter unit 12, dry calcium nitrate is separated from the combustion gas and discharged through line 13 to a collection device 14, while the combustion gas,77 with sulfur dioxide and nitrogen oxides removed therefrom, is discharged to the atmosphere through line 15. If desired, the dry calcium hydroxide, or at least a portion of thereof, from line 11 may be diverted through line 16 and injected into the combustion gas stream in line 7 prior to passage to the coronal discharge unit 8. Also, in order to maximize use of the injected dry calcium hydroxide, a portion of the calcium nitrate which may contain residual calcium hydroxide may be fed from the collection device 14 through line 17 to the calcium hydroxide source 10 for reuse.

Figure 2:
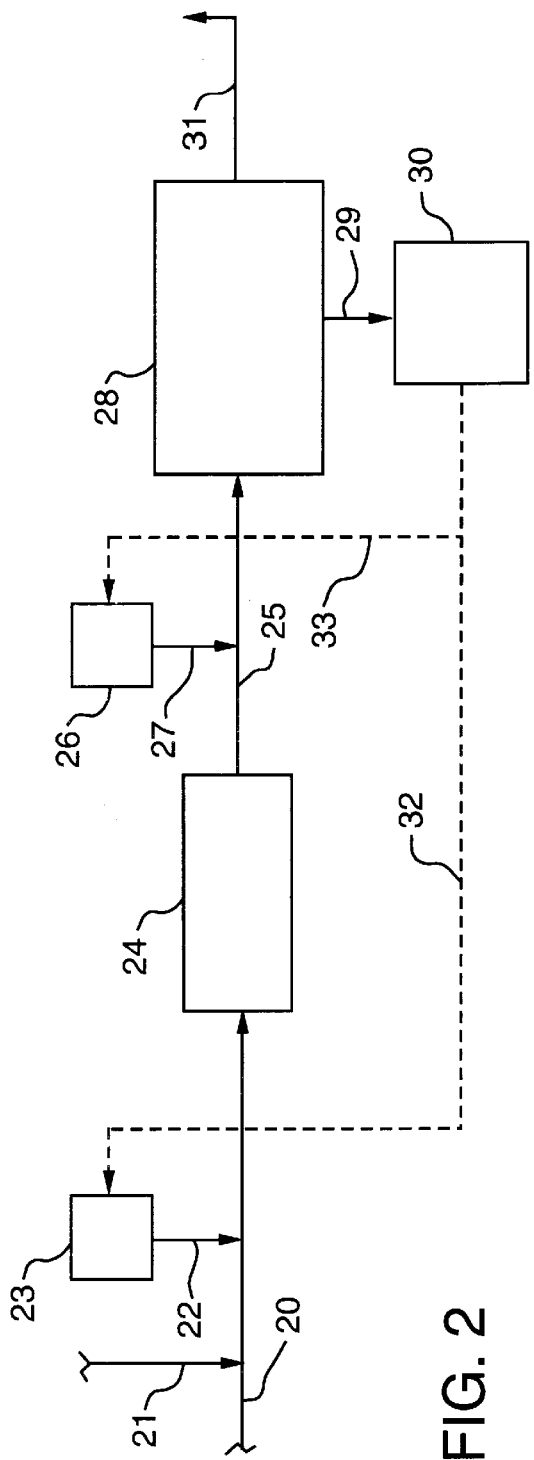
FIG. 2 illustrates schematically a second embodiment of the present invention.

In a second embodiment of the present invention, no wet scrubbing of the sulfur dioxide from the combustion gas stream is effected but rather removal of sulfur dioxide by dry calcium hydroxide injection is carried out, and the combustion gas stream substantially humidified prior to such treatment. As illustrated in FIG. 2, a combustion gas stream, containing sulfur dioxide and nitrogen oxides, is passed through a line 20 while water is injected into the gas stream through line 21 to substantially completely humidify the gas stream. Dry calcium hydroxide is then charged to the humidified gas stream in line 20 through line 22 from a source 23. The injected calcium hydroxide will react with sulfur dioxide present in the humidified gas stream to form calcium sulfite and/or calcium sulfate. The humidified combustion gas stream is then passed to a coronal discharge unit 24 where $NO_x$ present therein is converted to nitric acid. The combustion gas stream is discharged from the coronal discharge unit, as hereinbefore described, through line 25 and now contains calcium sulfite and/or calcium sulfate, as well as nitric acid. Additional dry calcium hydroxide is fed to line 25 from a source 26 through line 27, which additional calcium hydroxide reacts with nitric acid present in the combustion gas stream to form calcium nitrate. The combustion gas stream is then fed to a dry filtering device, such as a baghouse filter unit 26. In the baghouse filter unit 26, a mixture of calcium sulfite and/or calcium sulfate with calcium nitrate, and residual calcium hydroxide, is separated and discharged through line 29 to a collection device 30, while the combustion gas with sulfur dioxide and nitrogen oxides removed therefrom is discharged to the atmosphere through line 31. In order to maximize the use of the calcium hydroxide, a portion of the material from the collection device 30 may be returned to the dry calcium hydroxide sources 23 and 26 through lines 32 and 33 respectively.

What is claimed is:

1. A method of removing sulfur dioxide and nitrogen oxides from a gaseous stream containing the same comprising:

contacting said gaseous stream in a wet scrubbing unit with an aqueous medium, containing an alkaline earth compound selected from the group consisting of calcium carbonate, calcium hydroxide and magnesium hydroxide, which substantially humidified said gaseous stream to substantially complete saturation with water and reacts with sulfur dioxide present in the gaseous stream to remove the same as a sulfite or sulfate salt;

discharging the resultant substantially completely water saturated gaseous stream, after removal of sulfur dioxide and still containing nitrogen oxides, from said wet scrubbing unit and removing an aqueous effluent, containing a sulfite or sulfate salt, from said wet scrubbing unit;

exposing said discharged gaseous stream containing nitrogen oxides to a coronal discharge to form nitric acid in said gaseous stream and injecting dry calcium hydroxide into said gaseous stream to react with said nitric acid to form calcium nitrate;

separating said calcium nitrate and residual dry calcium hydroxide from said gaseous stream; and discharging said gaseous stream with sulfur dioxide and nitrogen oxides removed therefrom to the atmosphere.

2. The method of removing sulfur dioxide and nitrogen oxides from a gaseous stream containing the same as defined in claim 1 wherein said dry calcium hydroxide is injected into said gaseous stream prior to exposing of said gaseous stream to said coronal discharge.

3. The method of removing sulfur dioxide and nitrogen oxides from a gaseous stream containing the same as defined in claim 1 wherein said dry calcium hydroxide is injected into said gaseous stream after exposing of said gaseous stream to said coronal discharge.

4. The method of removing sulfur dioxide and nitrogen oxides from a gaseous stream containing the same as defined in claim 3 wherein additional dry calcium hydroxide is injected into said gaseous stream prior to exposing of said gaseous stream to said coronal discharge.

5. The method of removing sulfur dioxide and nitrogen oxides from a gaseous stream containing the same as defined in claim 1 wherein a portion of the separated calcium nitrate and residual dry calcium hydroxide is returned to further said gaseous stream.

6. The method of removing sulfur dioxide and nitrogen oxides from a gaseous stream containing the same as defined in claim 5 wherein said portion is returned to further said gaseous stream after contacting of the further gaseous stream in the wet scrubber and prior to exposing the same to said coronal discharge.

7. The method of removing sulfur dioxide and nitrogen oxides from a gaseous stream containing the same as defined in claim 5 wherein said portion is returned to further said gaseous stream after exposing the gaseous stream to said coronal discharge and prior to said separation.

8. The method of removing sulfur dioxide and nitrogen oxides from a gaseous stream containing the same as defined in claim 1 wherein said alkaline earth compound is calcium hydroxide and said salt is calcium sulfite.

9. The method of removing sulfur dioxide and nitrogen oxides from a gaseous stream containing the same as defined in claim 1 wherein said alkaline earth compound is calcium hydroxide and said salt is calcium sulfate.

10. The method of removing sulfur dioxide and nitrogen oxides from a gaseous stream containing the same as defined in claim 1 wherein said alkaline earth compound is magnesium hydroxide and said salt is magnesium sulfite.

11. A method of removing sulfur dioxide and nitrogen oxides from a gaseous stream containing the same comprising:

contacting said gaseous stream in a wet scrubbing unit with an aqueous medium, containing calcium hydroxide, which substantially humidifies said gaseous stream to substantially complete saturation with water and reacts with sulfur dioxide present in the gaseous stream to remove the same as calcium sulfite or calcium sulfate;

discharging the resultant substantially completely water saturated gaseous stream, after removal of sulfur dioxide and still containing nitrogen oxides, from said wet scrubbing unit and removing an aqueous effluent, containing calcium sulfite or calcium sulfate, from said wet scrubbing unit;

exposing said discharged gaseous stream containing nitrogen oxides to a coronal discharge to form nitric acid in said gaseous stream;

injecting dry further calcium hydroxide into said gaseous stream to react with said nitric acid and form calcium nitrate;

separating said calcium nitrate and residual dry calcium hydroxide from said gaseous stream; and discharging said gaseous stream with sulfur dioxide and nitrogen oxides removed therefrom to the atmosphere.

12. The method of removing sulfur dioxide and nitrogen oxides from a gaseous stream containing the same as defined in claim 11 wherein additional dry calcium hydroxide is injected into said gaseous stream prior to exposing of said gaseous stream to said coronal discharge.

13. The method of removing sulfur dioxide and nitrogen oxides from a gaseous stream containing the same as defined in claim 11 wherein a portion of the separated calcium nitrate and residual dry calcium hydroxide is returned to further said gaseous stream.

14. The method of removing sulfur dioxide and nitrogen oxides from a gaseous stream containing the same as defined in claim 13 wherein said portion is returned to further said gaseous stream after contacting of the further gaseous stream in the wet scrubber and prior to exposing the same to said coronal discharge.

15. The method of removing sulfur dioxide and nitrogen oxides from a gaseous stream containing the same as defined in claim 13 wherein said portion is returned to further said gaseous stream after exposing the gaseous stream to said coronal discharge and prior to said separation.

16. A method of removing sulfur dioxide and nitrogen oxides from a gaseous stream comprising:

contacting said gaseous stream in a wet scrubbing unit with an aqueous medium, containing calcium hydroxide, which substantially humidifies said gaseous stream to substantially complete saturation with water and reacts with sulfur dioxide present in the gaseous stream to remove the same as calcium sulfite or calcium sulfate;

discharging the resultant substantially completely water saturated gaseous stream, after removal of sulfur dioxide and still containing nitrogen oxides, from said wet scrubbing unit and removing an aqueous effluent, containing calcium sulfite or calcium sulfate, from said wet scrubbing unit;

injecting dry further calcium hydroxide into said humidified gaseous stream containing nitrogen oxides;

exposing said humidified gaseous stream containing nitrogen oxides and said further calcium hydroxide to a coronal discharge such that said nitrogen oxides are converted to nitric acid which reacts with said further dry calcium hydroxide to form calcium nitrate;

separating said calcium nitrate and residual dry calcium hydroxide from said gaseous stream; and discharging said gaseous stream with sulfur dioxide and nitrogen oxides removed therefrom to the atmosphere.

17. The method of removing sulfur dioxide and nitrogen oxides from a gaseous stream containing the same as defined in claim 16 wherein a portion of the separated calcium nitrate and residual dry calcium hydroxide is returned to further said gaseous stream.

18. The method of removing sulfur dioxide and nitrogen oxides from a gaseous stream containing the same as defined in claim 17 wherein said portion is returned to further said gaseous stream after contacting of the further gaseous stream in the wet scrubber and prior to exposing the same to said coronal discharge.

19. The method of removing sulfur dioxide and nitrogen oxides from a gaseous stream containing the same as defined in claim 17 wherein said portion is returned to further said gaseous stream after exposing the gaseous stream to said coronal discharge and prior to said separation.

20. A method of removing sulfur dioxide and nitrogen oxides from a gaseous stream comprising:

humidifying said gaseous stream to substantially saturate the same;

injecting dry calcium hydroxide into said humidified gaseous stream such that said calcium hydroxide reacts with sulfur dioxide present therein to form calcium sulfite or calcium sulfate;

exposing said gaseous stream, after injection of said dry calcium hydroxide and containing calcium sulfite or calcium sulfate and nitrogen oxides, to a coronal discharge to form nitric acid in said gaseous stream from said nitrogen oxides;

injecting further dry calcium hydroxide into said gaseous stream containing calcium sulfite or calcium sulfate and nitric acid which reacts with said nitric acid to form calcium nitrate;

separating said calcium sulfite or calcium sulfate, residual dry calcium hydroxide, and said calcium nitrate from said gaseous stream; and discharging said gaseous stream with sulfur dioxide and nitrogen oxides removed therefrom to the atmosphere.

21. The method of removing sulfur dioxide and nitrogen oxides from a gaseous stream containing the same as defined in claim 20 wherein a portion of the separated residual dry calcium hydroxide is returned to further said gaseous stream.

22. The method of removing sulfur dioxide and nitrogen oxides from a gaseous stream containing the same as defined in claim 21 wherein said portion is returned to further said gaseous stream after exposing of the further gaseous stream to said coronal discharge and prior to said separation.

23. The method of removing sulfur dioxide and nitrogen oxides from a gaseous stream containing the same as defined in claim 21 wherein said portion is returned to further said gaseous stream prior to exposing of the further gaseous stream to said coronal discharge.

* * * * *